(12) United States Patent
Wu et al.

(10) Patent No.: US 10,845,503 B2
(45) Date of Patent: Nov. 24, 2020

(54) THREE-DIMENSIONAL DIRECTIONAL TRANSIENT ELECTROMAGNETIC DETECTION DEVICE AND METHOD FOR MINING BOREHOLE

(71) Applicants: WUHAN CHANGSHENG MINE SECURITY TECHNOLOGY LIMITED, Wuhan, Hubei (CN); CHINA UNIVERSITY OF MINING AND TECHNOLOGY, BEIJING, Beijing (CN)

(72) Inventors: Qiang Wu, Beijing (CN); Liu Liu, Beijing (CN); Yifan Zeng, Beijing (CN); Fengjuan Tao, Beijing (CN); Chunsheng Liu, Beijing (CN)

(73) Assignee: WUHAN CHANGSHENG MINE SECURITY TECHNOLOGY LIMITED, Wuhan (CN)

( * ) Notice: Subject to any disclaimer, the term of this patent is extended or adjusted under 35 U.S.C. 154(b) by 68 days.

(21) Appl. No.: 16/132,505

(22) Filed: Sep. 17, 2018

(65) Prior Publication Data
US 2019/0086574 A1 Mar. 21, 2019

(30) Foreign Application Priority Data
Sep. 21, 2017 (CN) .......................... 2017 1 0861451

(51) Int. Cl.
*G01V 8/02* (2006.01)
*H04N 5/232* (2006.01)
*H04N 5/225* (2006.01)
*H04N 7/18* (2006.01)
*G01V 3/08* (2006.01)

(52) U.S. Cl.
CPC ................ *G01V 8/02* (2013.01); *G01V 3/083* (2013.01); *H04N 5/2253* (2013.01);
(Continued)

(58) Field of Classification Search
CPC ........ G01V 8/02; G01V 3/083; H04N 5/2253; H04N 5/23238; H04N 7/185
(Continued)

(56) References Cited

U.S. PATENT DOCUMENTS 5,850,624 A * 12/1998 Gard ...................... E21B 47/022
702/92
6,315,062 B1 * 11/2001 Alft .......................... E21B 7/046
175/45

(Continued)

*Primary Examiner* — Patrick Assouad
*Assistant Examiner* — Demetrius R Pretlow
(74) *Attorney, Agent, or Firm* — Luoh J. Wu; Continent Patent Office LLP

(57) ABSTRACT

Disclosed is a three-dimensional directional transient electromagnetic advanced detection device, wherein the CPU and the bus communication end of the transient electromagnetic transmitting module are both connected to the system bus, the signal output end of the transient electromagnetic transmitting module is connected to the transient electromagnetic transmitting coil outside the borehole to be detected, the signal input end of the electromagnetic signal receiving module is connected to the signal output ends of the three-dimensional magnetic field sensor and the one-dimensional Z-directional electric field sensor, the signal output end of the electromagnetic signal receiving module is connected to the electromagnetic signal input end of the SCM, the communication end of the first memory is connected to the data storage end of the SCM, the communication end of the three-dimensional electronic compass is connected to the compass signal communication end of the SCM, the host data communication of the SCM is connected to the second optical cable port of the local host through the first optical cable port and the optical cable. The device can detect harmful geological bodies such as aquifer and water-conducting channels and make a intensive and effective detection forecast.

9 Claims, 3 Drawing Sheets

(52) U.S. Cl.
CPC ......... *H04N 5/23238* (2013.01); *H04N 7/185* (2013.01); *G01V 2003/084* (2013.01); *G01V 2003/085* (2013.01); *H04N 2005/2255* (2013.01)

(58) Field of Classification Search
USPC ........................................................ 324/336
See application file for complete search history.

(56) References Cited

U.S. PATENT DOCUMENTS

| | | | | |
|---|---|---|---|---|
| 2008/0068023 | A1* | 3/2008 | Peter | G01V 3/30 324/338 |
| 2009/0030615 | A1* | 1/2009 | Clark | E21B 47/02216 702/7 |
| 2010/0082255 | A1* | 4/2010 | Davydycheva | G01V 3/28 702/7 |
| 2013/0176139 | A1* | 7/2013 | Chau | G01V 3/30 340/854.4 |
| 2013/0342210 | A1* | 12/2013 | Stokely | G01R 33/26 324/346 |
| 2016/0017706 | A1* | 1/2016 | Liu | H04W 52/367 340/853.2 |
| 2016/0123137 | A1* | 5/2016 | Liu | E21B 7/04 175/41 |
| 2016/0299252 | A1* | 10/2016 | Zacharko | G01V 3/38 |
| 2017/0160324 | A1* | 6/2017 | Hensarling | G01V 3/28 |
| 2017/0342822 | A1* | 11/2017 | Wilson | E21B 47/011 |
| 2018/0003032 | A1* | 1/2018 | Donzier | G01V 3/26 |
| 2018/0347353 | A1* | 12/2018 | Wang | E21B 7/04 |
| 2018/0348389 | A1* | 12/2018 | Jaaskelainen | E21B 41/0035 |
| 2019/0271223 | A1* | 9/2019 | Kraft | E21B 47/14 |
| 2019/0293830 | A1* | 9/2019 | Griffing | G01V 3/30 |

* cited by examiner

THREE-DIMENSIONAL DIRECTIONAL TRANSIENT ELECTROMAGNETIC DETECTION DEVICE AND METHOD FOR MINING BOREHOLE

CROSS-REFERENCE TO RELATED APPLICATIONS

The present application claims priority from Chinese patent Application No. CN201710861451.8 filed on Sep. 21, 2017, the entire contents of which are incorporated herein by reference.

FIELD OF THE INVENTION

The present invention relates to the field of geophysical electromagnetic detection technology, in particular to a three-dimensional directional transient electromagnetic advanced detection device and method for mining borehole.

BACKGROUND

Mine roadway excavation is an important part of coal seam mining. In the excavation process, the geological conditions in front of the excavation face must be pre-evaluated to ensure the rapid and sale excavation of the roadway. Hydrogeological conditions are an important aspect thereof. Generally, the types of water-conducting structure that may exist in front of roadway excavation include: fault fracture water-conducting zone, water-conducting collapse column, goaf hydrops, and rich-water karst zone. For the exploration of such poor geological factors, the commonly used means are borehole detection (referred to as "drilling") and geophysical exploration (referred to as "physical exploration"). Because the drilling method is costly and time consuming, and the drilling result is only a borehole, the scope of exploration is extremely limited. In addition, the construction borehole is easy to become the artificial passage of the hidden aquifer into the roadway, which causes secondary accidents. Therefore, it is difficult to meet the need of actual practice only by drilling means. Geophysical exploration has been widely used in underground water exploration because of its low cost, rapidity, large exploration range and long distance. In the application of mine geophysical methods, although there are many technologies, such as mine seismic reflection method, mine direct current method, mine electromagnetic method (transient electromagnetic method and radio wave tunneling method), Rayleigh surface wave method, geological radar, radioactivity measurement and infrared temperature measurement, but due to the sensitive characteristics of various methods and the limitation of tunneling space, most methods are difficult to apply in the tunneling face.

References: Huarong PARK, "*Principles of Electromagnetic Sounding*", Geological Publishing House, 1990; Zhijun NIU, "*The Principle of Time Domain Electromagnetic Method*", published by Central South University, 2007; Jingyu YU, "*Research on Transient Electromagnetic Theory and Technology of Mine*" [D], China University of Mining and Technology (Xuzhou), 2001; Zhixin LIU, "*Distribution Law and Application of Transient Electromagnetic Field in Mine*" [D], China University of Mining and Technology (Xuzhou); Zhihai JIANG, "*Research on Mechanism and Technology of Transient Electromagnetic Advanced Detection in Roadway heading face*" [D], China University of Mining and Technology (Xuzhou), 2008; Daiming TAN, "*Research on Transient Electromagnetic Response of Underground Full Space*" [J], Geophysical and Geochemical Exploration, 2009, 33(4): 436-439.

SUMMARY OF THE INVENTION

The object of the present invention is to provide a three-dimensional directional transient electromagnetic advanced detection device and method for mining borehole, by which a borehole which is drilling in a boring tunnel, a roadway heading face and working face can be detected, and the surrounding of the borehole can be detected. Harmful geological bodies such as aquifer and water-conducting channels in the range of 0 to 50 meters around the borehole can be detected and predicted accurately and effectively.

In order to achieve the object, a three-dimensional directional transient electromagnetic advanced detection device for mining borehole is provided, wherein the device comprises a local host, a probe, an optical cable, an electromagnetic transmitting coil, a three-dimensional magnetic field sensor in the probe, a one-dimensional Z-directional electric field sensor, an electromagnetic signal receiving module, a single-chip microcomputer (SCM), a first optical cable port, a first memory, and a three-dimensional electronic compass, and the local host comprises a CPU, a system bus and a transient electromagnetic transmitting module, wherein the CPU and the bus communication end of the transient electromagnetic transmitting module are connected to the system bus, the signal output end of the transient electromagnetic transmitting module is connected to the transient electromagnetic transmitting coil outside the borehole to be detected, the signal input end of the electromagnetic signal receiving module is connected to the signal output ends of the three-dimensional magnetic field sensor and the one-dimensional Z-directional electric field sensor, the signal output end of the electromagnetic signal receiving module is connected to the electromagnetic signal input end of the SCM, the communication end of the first memory is connected to the data storage end of the SCM, the communication end of the three-dimensional electronic compass is connected to the compass signal communication end of the SCM, the host data communication of the SCM is connected to the second optical cable port of the local host through the first optical cable port and the optical cable.

The transient electromagnetic transmitting coil is configured to transmit a pulse transient electromagnetic signal to the borehole to be detected under the control of the transient electromagnetic transmitting module and the CPU. The one-dimensional Z-directional electric field sensor of the probe is configured to receive the electromagnetic direct signal in the pulse transient electromagnetic signal emitted by the transient electromagnetic transmitting coil and the Z-directional secondary electric field signal of the rock mass around the borehole to be detected excited by the pulse transient electromagnetic signal. The three-dimensional magnetic field sensor is configured to receive the three-dimensional secondary magnetic field signal of the rock mass around the borehole to be detected excited by the pulsed transient electromagnetic signal. The three-dimensional electronic compass is configured to measure the trajectory data of the probe in the borehole to be detected.

The SCM is configured to make the electromagnetic direct signal, the Z-directional secondary electric field signal of the rock around the borehole to be detected excited by the pulse transient electromagnetic signal, and the three-dimensional secondary magnetic field signal of the rock mass around the borehole to be detected excited by the pulse transient electromagnetic signal to be digitally processed to obtain the digital signal data of the electromagnetic direct signal, the Z-directional secondary electric field signal and the three-dimensional secondary magnetic field signal, and store the digital signal data of the electromagnetic direct signal, the Z-directional secondary electric field signal and the three-dimensional secondary magnetic field signal into the first memory together with the trajectory data of the probe in the borehole to be detected obtained by the three-dimensional electronic compass.

The CPU is configured to generate corresponding images of the three-dimensional secondary magnetic field and the Z-directional secondary electric field and a borehole trajectory map, according to the digital signal data of the electromagnetic direct signal, the Z-directional secondary electric field signal and the three-dimensional secondary magnetic field signal and the trajectory data of the probe in the borehole to be detected.

A three-dimensional transient electromagnetic advanced detection method for mining borehole by using the device, wherein the method comprises the steps of:

Step 1—disposing the electromagnetic transmitting coil on the orifice plane of the borehole to be detected in the roadway wall, making the plane of the electromagnetic transmitting coil perpendicular to the borehole to be detected, making the axis of the borehole to be detected coincide with the axis of the electromagnetic transmitting coil, and disposing the probe into the borehole to be detected;

Step 2—controlling the transient electromagnetic transmitting module by the CPU to transmit a pulse transient electromagnetic signal to the borehole to be detected through the transient electromagnetic transmitting coil;

Step 3—receiving the electromagnetic direct signal in the pulse transient electromagnetic signal emitted by the transient electromagnetic transmitting coil and the Z-directional secondary electric field signal of the rock mass around the borehole to be detected excited by the pulse transient electromagnetic signal by the one-dimensional Z-directional electric, field sensor of the probe, receiving the three-dimensional secondary magnetic field signal of the rock mass around the borehole to be detected excited by the pulse transient electromagnetic signal by the three-dimensional magnetic field sensor, and measuring the trajectory data of the probe in the borehole to be detected by the three-dimensional electronic compass;

Step 4—digitally processing the electromagnetic direct signal, the Z-directional secondary electric field signal of the rock around the borehole to be detected excited by the pulse transient electromagnetic signal, and the three-dimensional secondary magnetic field signal of the rock mass around the borehole to be detected excited by the pulse transient electromagnetic signal by the SCM, and obtaining the digital signal data of the electromagnetic direct signal, the Z-directional secondary electric field signal and the three-dimensional secondary magnetic field signal, and storing the digital signal data of the electromagnetic direct signal, the Z-directional secondary electric field signal and the three-dimensional secondary magnetic field signal into the first memory together with the trajectory data of the probe in the borehole to be detected obtained by the three-dimensional electronic compass; and Step 5—gradually advancing the probe from the orifice to the bottom of the borehole to be detected, and performing a point-by-point scanning detection of the borehole to be detected by using the methods as described in Steps 2 to 4, that is, performing a detection at each preset detection point, to obtain the electromagnetic direct signal, the Z-directional secondary electric field signal, the three-dimensional secondary magnetic field signal and the probe trajectory data of each preset detection point of the borehole to be detected from the orifice, to the bottom of the borehole, and obtaining the electromagnetic direct signal, the Z-directional secondary electric field signal, the three-dimensional secondary magnetic field signal and the probe trajectory data of each preset detection point from the orifice to the bottom of the borehole to be detected by the SCM through the electromagnetic direct signal, the Z-directional secondary electric field signal, the three-dimensional secondary magnetic field signal and the probe trajectory data of each preset detection point from the orifice to the bottom of the borehole to be detected.

The invention can realize the advanced detection and prediction on borehole of the tunnel and the roadway. Compared with the existing advanced forecasting equipment and methods, the beneficial effects of the present invention are mainly manifested in that:

(1) The present invention can overcome the problem that it is often concerned about only "one borehole" and difficult to judge the situation around the borehole. The distribution of high and low resistance bodies around the borehole can be explored by using the three-dimensional transient electromagnetic method, thereby distinguishing the lithology of the rock mass around the borehole and mastering the geological conditions around the borehole. At the same time, there are a large number of gas drainage boreholes and hydrological boreholes in the coal mine, which provides the sites and conditions for the research and improves the utilization rate of the boreholes.

(2) The present invention can realize three-dimensional transient electromagnetic detection in borehole, to obtain a large amount of detecting data, and avoid the artificially strong interference background in borehole (due to single surrounding rock around the borehole, no roadheader, metal rails of bottom plate, I-beam support, bolt support, transport belt bracket and other metal facilities), thereby improving the identification and processing capability of weak signals, which ensures accurate and reliable detection results and provides a more scientific guide for tunneling.

(3) The present invention can realize a real-time display of detection result when detecting by the local host, automatically analyzing and mapping and forecasting, without complicated manual data analysis and processing stages; and can quickly provide reliable analysis and forecast data for the geological exploration personnel. Therefore, the device of the present invention has advantages such as operability, effectiveness, and practicality.

The present invention achieves the advanced detection of roadway drilling and performs a geophysical exploration by using roadway leading ahead (drilling in front of the tunneling face, that is, drilling the borehole ahead relative to the tunneling face), and a close-range and fine scanning detection can be achieved within a radius of 0~50 m around the borehole. It is a combination of drilling and geophysical exploration, so that it cannot only improve the detection accuracy of geophysical prospecting, but also reduce the number of drilling boreholes to achieve the advanced and accurate detection of roadway in driving.

1—local host, 1.1—CPU, 1.2—second memory, 1.3—human-computer interaction device, 1.4—battery, 1.5—system bus, 1.6—second optical cable port, 1.7—transient electromagnetic emission module, 2—Probe, 2.1—three-dimensional magnetic field sensor, 2.1.1—X-axis magnetic field sensor, 2.1.2—Y-axis magnetic field sensor, 2.1.3—Z-axis magnetic field sensor, 2.2—one-dimensional Z-directional electric field sensor, 2.3—electromagnetic signal receiving module, 2.4—SCM, 2.5—first optical cable port, 2.6—first memory, 2.7—three-dimensional electronic compass, 3—optical cable, 4—push rod, 5—borehole to be detected, 6—electromagnetic transmitting coil, 6.1—cable, 6.2—transmitting coil interface, 7—roadway.

DESCRIPTION OF THE PREFERRED EMBODIMENTS

The invention will be further described in detail in combination with the accompanying drawings.

Figure 1:
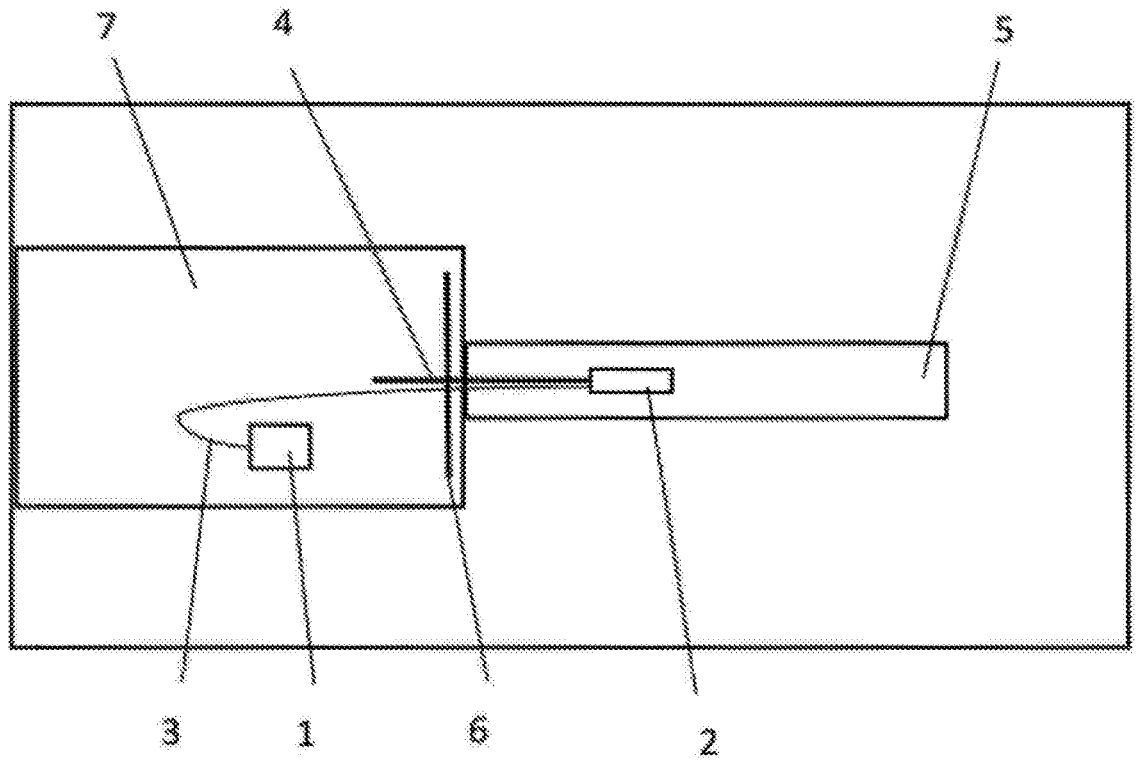
FIG. 1 is a schematic view showing the use state of structural portions of the present invention.
Figure 2:
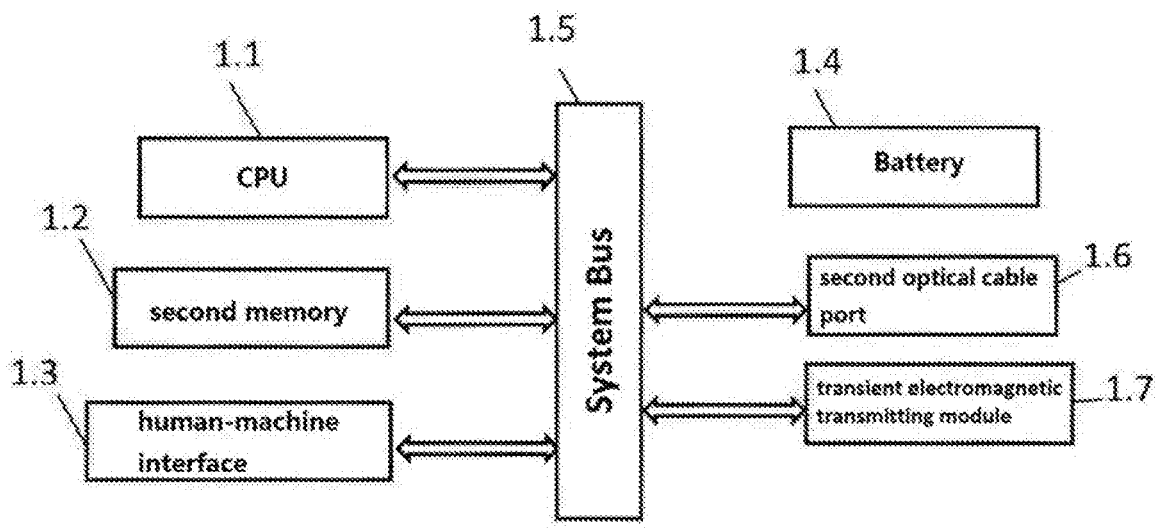
FIG. 2 is a structural block diagram of a local host of the present invention.
Figure 3:
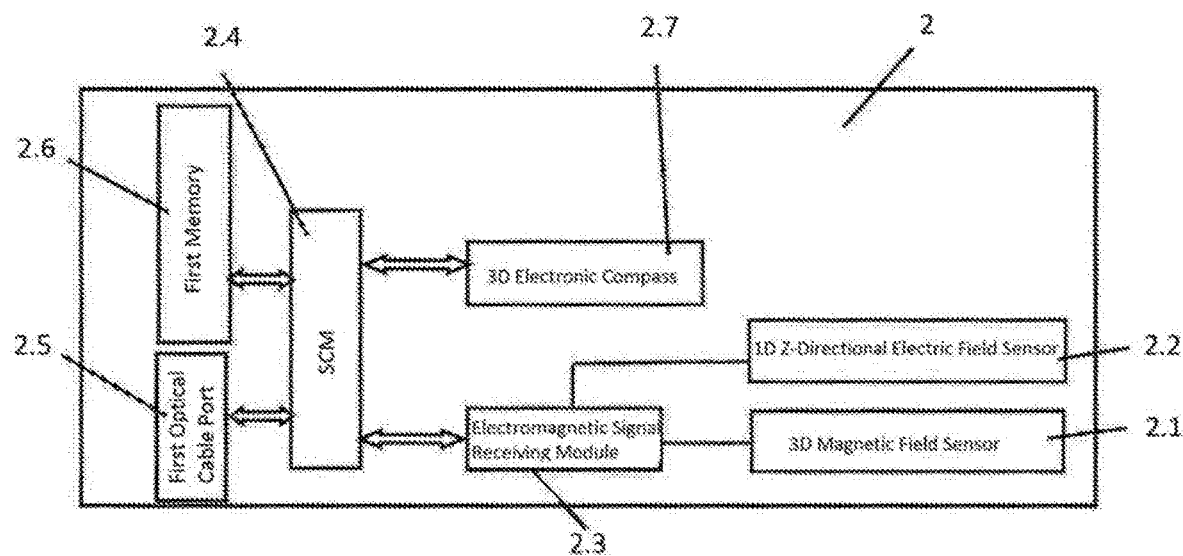
FIG. 3 is a structural block diagram of a probe of the present invention.
Figure 4:
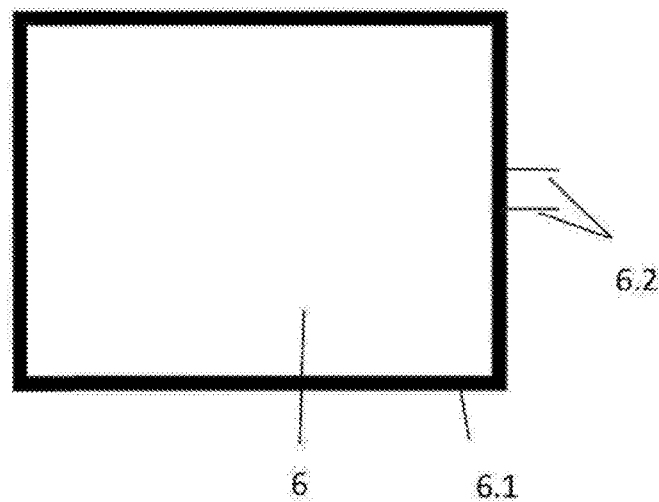
FIG. 4 is a schematic structural view of a transmitting coil of the present invention.
Figure 5:
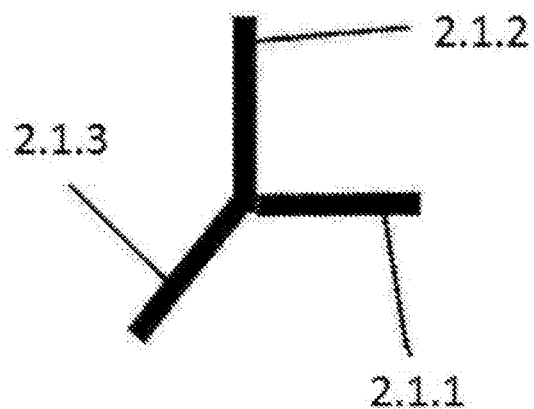
FIG. 5 is a schematic illustration of a three dimensional magnetic field sensor in accordance with the present invention.

As shown in FIGS. 1 to 5, the three-dimensional directional transient electromagnetic advanced detection device for mining borehole comprises a local host 1 (in a roadway 7), a probe 2, a optical cable 3, an electromagnetic transmitting coil 6, a three-dimensional magnetic field sensor 2.1 in the probe 2, a one-dimensional Z-directional electric field sensor 2.2, an electromagnetic signal receiving module 2.3, a SCM 2.4, a first optical cable port 2.5, a first memory 2.6, a three-dimensional electronic compass 2.7. The local host 1 comprises a CPU 1.1, system bus 1.5 and a transient electromagnetic emission module 1.7, wherein the CPU 1.1 and the bus communication end of the transient electromagnetic transmission module 1.7 are connected to the system bus 1.5, the signal output end of the transient electromagnetic emission module 1.7 is connected to the transient electromagnetic transmitting coil 6 outside of the borehole 5 to be detected, the signal input end of the electromagnetic signal receiving module 2.3 is connected to the signal output end of the three-dimensional magnetic field sensor 2.1 and the one-dimensional Z-directional electric field sensor 2.2, the signal output end of the electromagnetic signal receiving module 2.3 is connected to the electromagnetic signal input of the SCM 2.4, the communication end of the first memory 2.6 is connected to the data storage end of the SCM 2.4, and the communication end of the three-dimensional electronic compass 2.7 is connected to the compass signal communication end of the SCM 2.4, and the host data communication of the SCM 2.4 is connected to the second cable port 1.6 of the local host 1 through the first cable port 2.5 and the optical cable 3.

The transient electromagnetic transmitting coil 6 is configured to emit a pulse transient electromagnetic signal to the borehole 5 to, be detected under the control of the transient electromagnetic transmitting module 1.7 and the CPU 1.1. The one-dimensional Z-directional electric field sensor 2.2 of the probe 2 is configured to receive an electromagnetic direct signal in the pulse transient electromagnetic signal emitted by the transient electromagnetic transmitting coil 6 and a Z-directional secondary electric field signal of the rock mass around the borehole 5 to be detected excited by the pulse transient electromagnetic signal. The three-dimensional magnetic field sensor 2.1 is configured to receive a three-dimensional secondary magnetic field signal of the rock mass around the borehole 5 to be detected excited by the pulse transient electromagnetic signal. The three-dimensional electronic compass 2.7 is configured to measure a trajectory data of the probe 2 in the borehole 5 to be detected.

The SCM 2.4 is configured to make the electromagnetic direct signal, the Z-directional secondary electric field signal of the rock mass around the borehole 5 to be detected excited by the pulse transient electromagnetic signal and the three-dimensional secondary magnetic field signal of the rock mass around the borehole 5 to be detected excited by the electromagnetic signal to be digitally processed to obtain the digital signals of the electromagnetic direct signal, the Z-directional secondary electric field signal and the three-dimensional secondary magnetic field signal, and store the digital signals of the electromagnetic direct signal, the Z-directional secondary electric field signal and the three-dimensional secondary magnetic field signal into the first memory 2.6 together with the probe trajectory data of the probe 2 in the borehole 5 to be, detected obtained by the three-dimensional electronic compass 2.7.

The CPU 1.1 is configured to generate corresponding maps of the three-dimensional secondary magnetic field and the Z-directional secondary electric field and a borehole trajectory map, according to the digital signal data of the electromagnetic direct signal, the Z-directional secondary electric field signal, the three-dimensional secondary magnetic field signal and the trajectory data of the probe 2 in the borehole 5 to be detected.

In the above technical solution, the orientation of the target body can be analyzed and determined according to the data of the three-dimensional magnetic field, which plays a role of positioning. Since the borehole has a large diameter, only one electric field sensor in Z-axis direction can be arranged without the electrodes in X and Y directions, so that the target body can be analyzed more accurately by using the magnetic field and the electric field to measure and analyze simultaneously, which is equivalent to multi-parameter detection and analysis.

In the above technical solution, the battery 1.4 supplies power to each device in the local host 1 respectively.

In the above technical solution, the CPU 1.1 further comprises a second memory 1.2 and a human-machine interaction device 1.3, and the second memory 1.2 and the human-machine interaction device 1.3 are both connected to the system bus 1.5. The human-machine interaction device 1.3 comprises a touch screen, a display screen, a USB interface, and a photoelectric knob.

In the above technical solution, the casing of the probe 2 is formed by a PVC (polyvinyl chloride) tube with a diameter of 40 mm sealed with a plastic plug (metal material may have an additional magnetic field which has an influence on the three-dimensional magnetic sensor, and will has an influence on the electric field due to the electrical conductivity thereof). The three-dimensional directions of the three-dimensional magnetic field sensor 2.1 are consistent with the directions of the three-dimensional electronic compass 2.7 (the electric field should be observed in a certain distance, if the distance is too long, the probe will be too large and inconvenient, if the distance is too short, the observation sensitivity will be reduced, so that the distance should be reasonable). The one-dimensional Z-directional electric field sensor 2.2 is composed of two copper rings insulated and apart from each other at a distance of about 0.5 to 1.0 m, which are embedded on the plastic tube by protruding from the outer surface of 2 to 3 mm (to make the electrodes can contact with the wall of the borehole, and if protruded too much, easy to be stuck in the borehole and inconvenient to use).

In the above technical solution, the three-dimensional magnetic field sensor 2.1 is composed of three magnetic field sensors of an X-axis magnetic field sensor 2.1.1, a Y-axis magnetic field sensor 2.1.2, and a Z-axis magnetic field sensor 2.13, respectively, for receiving the X, Y, Z directional magnetic field intensity.

In the above technical solution, the electromagnetic transmitting coil 6 is composed of a multi-turn cable 6.1 and a transmitting coil interface 6.2, and the electromagnetic transmitting coil 6 is wound into a square or a circle shape. The side length of the square shape is 1.5 to 3 m, and the diameter of the circle shape is 2 to 3 m (because generally the coal mine roadway has a width of only 3 to 5 m, if the size of the coil 6 is too large then it is hard to be used, and if too small then it is hard to improve the transmission power on detection, so that the mentioned-above sizes are reasonably).

A three-dimensional transient electromagnetic advanced detection method for mining borehole by using the above device, comprising the steps of:

Step 1—disposing the electromagnetic transmitting coil 6 on the orifice plane of the borehole 5 to be detected in the wall of the roadway 7, making the plane of the electromagnetic transmitting coil 6 perpendicular to the borehole 5 to be detected, making the axis of the borehole 5 to be detected coincide with the axis of the electromagnetic transmitting coil 6, and disposing the probe 2 into the borehole 5 to be detected;

Step 2—controlling the transient electromagnetic transmitting module 1.7 by the CPU 1.1 to emit a pulse transient electromagnetic signal to the borehole 5 to be detected through the transient electromagnetic transmitting coil 6;

Step 3—receiving the electromagnetic direct signal in the pulse transient electromagnetic signal emitted by the transient electromagnetic transmitting coil 6 and the Z-directional secondary electric field signal of the rock mass around the borehole 5 to be detected excited by the pulse transient electromagnetic signal by the one-dimensional Z-directional electric field sensor 2.2 of the probe 2, receiving the three-dimensional secondary magnetic field signal of the rock mass around the borehole 5 to be detected excited by the pulse transient electromagnetic signal by the three-dimensional magnetic field sensor 2.1, and measuring the trajectory data of the probe 2 in the borehole 5 to be detected by the three-dimensional electronic compass 2.7;

Step 4—digitally processing the electromagnetic direct signal, the Z-directional secondary electric field signal of the rock, around the borehole 5 to be detected excited by the pulse transient electromagnetic signal, and the three-dimensional secondary magnetic field signal of the rock mass around the borehole 5 to be detected excited by the pulse transient electromagnetic signal by the SCM 2.4, and obtaining the digital signal data of the electromagnetic direct signal, the Z-directional secondary electric field signal and the three-dimensional secondary magnetic field signal, and storing the digital signal data of the electromagnetic direct signal, the Z-directional secondary electric field signal and the three-dimensional secondary magnetic field signal into the first memory 2.6 together with the trajectory data of the probe 2 in the borehole 5 to be detected obtained by the three-dimensional electronic compass 2.7;

Step 5—gradually advancing the probe 2 from the orifice to the bottom of the borehole 5 to be detected by using a push rod 4, and performing a point-by-point scanning detection of the borehole 5 to be detected by using the methods as described in Steps 2 to 4, that is, performing a detection at each preset detection point, to obtain the electromagnetic direct signal, the Z-directional secondary electric field signal, the three-dimensional secondary magnetic field signal and the probe trajectory data of each preset detection point of the borehole 5 to be detected from the orifice to the bottom of the borehole, and obtaining the electromagnetic direct signal, the Z-directional secondary electric field signal, the three-dimensional secondary magnetic field signal and the probe trajectory data of each preset detection point from the orifice to the bottom of the borehole 5 to be detected by the SCM 2.4 through the electromagnetic direct signal, the Z-directional secondary electric field signal, the three-dimensional secondary magnetic field signal and the probe trajectory data of each preset detection point from the orifice to the bottom of the borehole 5 to be detected;

Step 6: generating corresponding maps of the three-dimensional secondary magnetic field and the Z-directional secondary electric field and a borehole trajectory map by using the following formula (1) and (2) by the CPU 1.1, according, to the digital signal data of the electromagnetic direct signal, the Z-directional secondary electric field signal, the three-dimensional secondary magnetic field signal and the trajectory data of the probe 2 in the borehole 5 to be detected;

$$M_{ij} = \frac{M_{1ij}}{M_{0ij}} \quad (1)$$

$$E_{zj} = \frac{E_{1j}}{E_{0j}} \quad (2)$$

wherein $M_{ij}$—the calculated magnetic field signal of the normalized secondary magnetic field at the $j^{th}$ point in the $i^{th}$ direction;

$M_{0ij}$—the detected magnetic field signal of the direct primary magnetic field at the $j^{th}$ point in the $i^{th}$ direction;

$M_{1ij}$—the detected magnetic field signal of the excited secondary magnetic field the $j^{th}$ point in the $i^{th}$ direction;

$E_{zj}$—the calculated electric field signal of the normalized secondary electric field at the $j^{th}$ point in the Z direction;

$E_{0j}$—the detected electric field signal of the direct primary electric field at the $j^{th}$ point in the Z direction;

$E_{1j}$—the detected electric field signal of the excited secondary electric field at the $j^{th}$ point in the Z direction;

i—x, y, z direction;

j—1, 2, 3, . . . , n of the test point;

wherein the data of each test point comprises the direct, field signal (primary field) and the field signal (secondary field) excited by the direct field in which the secondary field is divided by the direct field to obtain the test signal at local point, which is equivalent to normalization;

wherein each test point has a total of four test data (X, Y, Z directional magnetic field data and Z directional electric field data), and each borehole is tested at different depths to form a number of points to be tested, so that four data maps consisted of different test points of the entire borehole can be generated (map of test point—numerical value); and Step 7: according to the three-dimensional secondary magnetic field map and the Z-directional secondary electric field map obtained in Step 6 combined with the drilling trajectory map, determining the data larger than three times of the mean-variance of all the data of the three-dimensional secondary magnetic field map and the Z-directional secondary electric field map as abnormal data generated by the abnormal body by Using the CPU 1.1, wherein since low resistive body (comparing with the resistivity of the rock mass around the borehole, general aquifer has a resistivity lower than that of the rock mass around the borehole) is easy to generate larger magnetic field signal and electric field signal, thereby determining whether there is a low-resistive body in the rock mass around the borehole 5 to be detected by analysis of the abnormal data generated by the abnormal body, and determining whether there is aquifer in the rock mass around the borehole 5 to be detected by analysis of the abnormal data due to the aquifer has a lower resistivity (the data value larger than 3 times of the mean-variance of all data), so that if there is the aquifer, determining the specific position of the aquifer and making a forecast accordingly to realize the advanced detection and prediction of the borehole 5 to be detected.

In Step 7, if it is determined that there is aquifer in the rock mass around the borehole 5 to be detected, it is determined which direction of the aquifer in the 3D body of the borehole 5 to be detected is to achieve the three-dimensional orientation by using the local host 1 according to the three-dimensional magnetic field data of the borehole 5 to be detected in all depth of the borehole 5 and the trajectory map of the borehole 5 to be detected obtained in Step 6, by using the magnitude and direction (positive and negative) values of the three-dimensional magnetic field.

The technical contents without a detailed description in the specification should be well-known for those skilled in the art. It will be appreciated by those skilled in the art that variations and modifications are obvious within the scope of the appended claims.

The invention claimed is:

1. A three-dimensional directional transient electromagnetic advanced detection device for mining borehole, wherein the device comprises a local host (1), a probe (2), an optical cable (3), an electromagnetic transmitting coil (6), wherein the probe (2) comprises: a three-dimensional magnetic field sensor (2,1), a one-dimensional Z-directional electric field sensor (2.2), an electromagnetic signal receiving circuit (2.3), a SCM (2.4), a first optical cable port (2.5), a first memory (2.6), and a three-dimensional electronic compass (2.7), and the local host (1) comprises a CPU (1.1), a system bus (1.5) and a transient electromagnetic transmitting circuit (1.7), wherein the CPU (1.1) and the bus communication end of the transient electromagnetic transmitting circuit (1.7) are connected to the system bus (1.5), the signal output end of the transient electromagnetic transmitting circuit (1.7) is connected to the transient electromagnetic transmitting coil (6) outside the borehole (5) to be detected, the signal input end of the electromagnetic signal receiving circuit (2.3) is connected to the signal output ends of the three-dimensional magnetic field sensor (2.1) and the one-dimensional Z-directional electric field sensor (2.2), the signal output end of the electromagnetic signal receiving circuit (2.3) is connected to the electromagnetic signal input end of the SCM (2.4), the communication end of the first memory (2.6) is connected to the data storage end of the SCM (2.4), the communication end of the three-dimensional electronic compass (2.7) is connected to the compass signal communication end of the SCM (2.4), the host data communication of the SCM (2.4) is connected to the second optical cable port (1.6) of the local host (1) through the first optical cable port (2.5) and the optical cable (3);

wherein the transient electromagnetic transmitting coil (6) is configured to transmit a pulse transient electromagnetic signal to the borehole (5) to be detected under the control of the transient electromagnetic transmitting circuit (1.7) and the CPU (1.1), the one-dimensional Z-directional electric field sensor (2.2) of the probe (2) is configured to receive the electromagnetic direct signal in the pulse transient electromagnetic signal emitted by the transient electromagnetic transmitting coil (6) and the Z-directional secondary electric field signal of the rock mass around the borehole (5) to be detected excited by the pulse transient electromagnetic signal, the three-dimensional magnetic field sensor (5) is configured to receive the three-dimensional secondary magnetic field signal of the rock mass around the borehole to be detected excited by the pulsed transient electromagnetic signal and the three-dimensional electronic compass (2.7) is configured to measure the trajectory data of the probe (2) in the borehole (5) to be detected;

wherein the SCM (2.4) is configured to make the electromagnetic direct signal, the Z-directional secondary electric field signal of the rock around the borehole (5) to be detected excited by the pulse transient electromagnetic signal, and the three-dimensional secondary magnetic field signal of the rock mass around the borehole (5) to be detected excited by the pulse transient electromagnetic signal to be digitally processed to obtain the digital signal data of the electromagnetic direct signal, the Z-directional secondary electric field signal and the three-dimensional secondary magnetic field signal, and store the digital signal data of the electromagnetic direct signal, the Z-directional secondary electric field signal and the three-dimensional secondary magnetic field signal into the first memory (2.6) together with the trajectory data of the probe (2) in the borehole (5) to be detected obtained by the three-dimensional electronic compass (2.7); and wherein the CPU (1.1) is configured to generate corresponding maps of the three-dimensional secondary magnetic field and the Z-directional secondary electric field and a borehole trajectory map, according to the digital signal data of the electromagnetic direct signal, the Z-directional secondary electric field signal and the three-dimensional secondary magnetic field signal and the trajectory data of the probe (2) in the borehole (5) to be detected.

2. The three-dimensional directional transient electromagnetic advanced detection device for mining borehole according to claim 1, wherein the CPU (1.1) further comprises a second memory (1.2) and a human-machine interactive device (1.3), and the second memory (1.2) and the human-machine interactive device (1.3) are both connected to the system bus (1.5).

3. The three-dimensional directional transient electromagnetic advanced detection device for mining borehole according to claim 1, wherein the casing of the probe (2) is formed by a PVC tube sealed with a plastic plug and the three-dimensional directions of the three-dimensional magnetic field sensor (2.1) are consistent with the directions of the three-dimensional electronic compass (2.7).

4. The three-dimensional directional transient electromagnetic advanced detection device for mining borehole according to claim 1, wherein the three-dimensional magnetic field sensor (2.1) is composed of three magnetic field sensors of an X-axis magnetic field sensor (2.1.1), a Y-axis magnetic field sensor (2.1.2), and a Z-axis magnetic field sensor (2.1.3), respectively, for receiving the X, Y, Z directional magnetic field intensity.

5. The three-dimensional directional transient electromagnetic advanced detection device for mining borehole according to claim 1, wherein the electromagnetic transmitting coil (6) is composed of a multi-turn cable (6.1) and a transmitting coil interface (6.2), and the electromagnetic transmitting coil (6) is wound into a square shape with a side length of 1.5-3 m or a circle shape with a diameter of 2-3 m.

6. A three-dimensional transient electromagnetic advanced detection method for mining borehole by using the device according to claim 1, wherein the method comprises the steps of:

Step 1—disposing the electromagnetic transmitting coil (6) on the orifice plane of the borehole (5) to be detected in the roadway (7) wall, making the plane of the electromagnetic transmitting coil (6) perpendicular to the borehole (5) to be detected, making the axis of the borehole (5) to be detected coincide with the axis of the electromagnetic transmitting coil (6), and disposing the probe (2) into the borehole (5) to be detected;

Step 2—controlling the transient electromagnetic transmitting circuit (1.7) by using the CPU (1.1) to transmit a pulse transient electromagnetic signal to the borehole (5) to be detected through the transient electromagnetic transmitting coil (6);

Step 3—receiving the electromagnetic direct signal in the pulse transient electromagnetic signal emitted by the transient electromagnetic transmitting coil (6) and the Z-directional secondary electric field signal of the rock mass around the borehole (5) to be detected excited by the pulse transient electromagnetic signal by using the one-dimensional Z-directional electric field sensor (2.2) of the probe (2), receiving the three-dimensional secondary magnetic field signal of the rock mass around the borehole (5) to be detected excited by the pulse transient electromagnetic signal by the three-dimensional magnetic field sensor (2.1), and measuring the trajectory data of the probe (2) in the borehole (5) to be detected by the three-dimensional electronic compass (2.7);

Step 4—digitally processing the electromagnetic direct, signal, the Z-directional secondary electric field signal of the rock around the borehole (5) to be detected excited by the pulse transient electromagnetic signal, and the three-dimensional secondary magnetic field signal of the rock mass around the borehole (5) to be detected excited by the pulse transient electromagnetic signal by using the SCM (2.4), and obtaining the digital signal data of the electromagnetic direct signal, the Z-directional secondary electric field signal and the three-dimensional secondary magnetic field signal, and storing the digital signal data of the electromagnetic direct signal, the Z-directional secondary electric field signal and the three-dimensional secondary magnetic field signal into the first memory (2.6) together with the trajectory data of the probe (2) in the borehole (5) to be detected obtained by the three-dimensional electronic compass (2.7; and Step 5—gradually advancing the probe (2) from the orifice to the bottom of the borehole (5) to be detected, and performing a point-by-point scanning detection of the borehole (5) to be detected by using the methods of Steps 2 to 4, that is, performing a detection at each preset detection point, to obtain the electromagnetic direct signal, the Z-directional secondary electric field signal, the three-dimensional secondary magnetic field signal and the probe trajectory data of each preset detection point of the borehole (5) to be detected from the orifice to the bottom of the borehole (5) to be detected, and obtaining the electromagnetic direct signal, the Z-directional secondary electric field signal, the three-dimensional secondary magnetic field signal and the probe trajectory data of each preset detection point from the orifice to the bottom of the borehole (5) to be detected by using the SCM (2.4) through the electromagnetic direct signal, the Z-directional secondary electric field signal, the three-dimensional secondary magnetic field signal and the probe trajectory data of each preset detection point from the orifice to the bottom of the borehole (5) to be detected.

7. The three-dimensional transient electromagnetic advanced detection method for mining borehole by using the device according to claim 6, further comprising Step 6—generating corresponding maps of the three-dimensional secondary magnetic field and the Z-directional secondary electric field and a borehole trajectory map by using the CPU (1.1) according to the digital signal data of the electromagnetic direct signal, the Z-directional secondary electric field signal, the three-dimensional secondary magnetic field signal and the trajectory data of the probe (2) in the borehole (5) to be detected.

8. The three-dimensional transient electromagnetic advanced detection method for mining borehole by using the device according to claim 7, further comprising Step 7—according to the three-dimensional secondary magnetic field map and the Z-directional secondary electric field map obtained in Step 6 combined with the borehole trajectory map, determining the data larger than three times of the mean-variance of all the data of the three-dimensional secondary magnetic field map and the Z-directional secondary electric field map as abnormal data generated by the abnormal body by using the CPU (1.1), determining whether there is a low-resistive body in the rock mass around the borehole (5) to be detected by analysis of the abnormal data generated by the abnormal body, thereby determining whether there is aquifer in the rock mass around the borehole (5) to be detected by analysis of the abnormal data, and then if there is the aquifer, determining the specific position of the aquifer and making a forecast accordingly to realize the advanced detection and prediction of the borehole (5) to be detected.

9. The three-dimensional transient electromagnetic advanced detection method for mining borehole by using the device according to claim 8, wherein if it is determined that there is aquifer in the rock mass around the borehole (5) to be detected, then determining which direction of the aquifer in the 3D body of the borehole (5) to be detected is to achieve the three-dimensional orientation by using the local host (1), according to the three-dimensional magnetic field data of the borehole (5) to be detected in all depth of the borehole (5) and the trajectory map of the borehole (5) to be detected obtained in Step 6, by using the magnitude and direction values of the three-dimensional magnetic field.

* * * * *